Patented Dec. 2, 1947

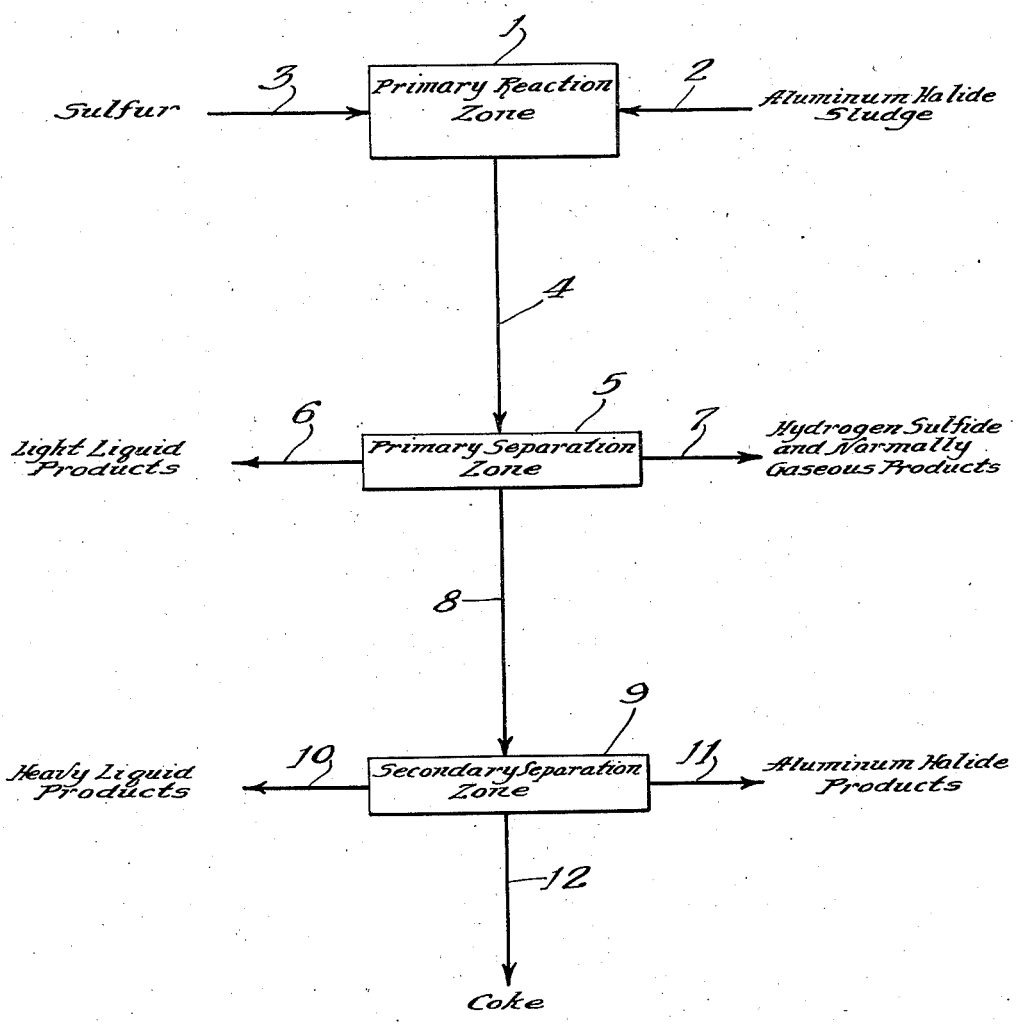

2,431,768

UNITED STATES PATENT OFFICE 2,431,768

RECOVERY OF ALUMINUM HALIDES FROM SLUDGES THEREOF

Maurice J. Murray, Clarendon Hills, Ill., assignor to Universal Oil Products Company, Chicago, Ill., a corporation of Delaware Application March 1, 1946, Serial No. 651,397

7 Claims. (Cl. 23—96)

The present invention relates to a method for recovering aluminum halides from sludges containing the same formed when said aluminum halides are utilized as catalysts for the conversion of certain organic reactants, especially the conversion of hydrocarbons. More particularly, the invention concerns the recovery of aluminum halides from sludges containing the same by a process in which elemental sulfur is utilized as a specific reactant to release said aluminum halide from combination with the organic material contained in said sludge.

The aluminum halide sludges herein referred to are formed during certain conversion reactions in which aluminum halides of the middle halogens, that is aluminum chloride and aluminum bromide, are employed as catalysts to effect the given conversion. The principal sources of said sludges are those formed in hydrocarbon conversion reactions, such as the alkylation, isomerization, and polymerization of various hydrocarbon reactants, the sludge forming in the reactor as a distinct semi-fluid phase comprising an addition complex of said aluminum halide and hydrocarbons. Normally, the aluminum halide is charged as the anhydrous compound to act in a catalytic capacity in the conversion reaction, but as the reaction proceeds, a portion of the hydrocarbons form, either by direct addition thereto or by a series of miscellaneous reactions, a complex addition compound which separates from the reaction mixture as the hydrocarbon-insoluble sludge herein referred to. The resultant spent sludge has been found to be in itself and without further treatment substantially inactive in catalyzing further conversions of the charging stock and has heretofore been withdrawn from the process and disposed of in any convenient manner. The latter practice results not only in the loss of a valuable reagent which I have discovered, according to this invention, can be recovered for reuse in the conversion reaction, but it also creates a disposal problem of no small proportions. It is therefore the principal object of the present invention to provide a process whereby the aluminum halide contained in sludges of the aforementioned description is recovered therefrom in a condition suitable for reuse in the process from which it is derived.

In one specific embodiment of the invention, an aluminum halide sludge, wherein said aluminum halide may be either aluminum chloride or aluminum bromide, is reacted with elemental sulfur at elevated temperatures and the resultant product is separated into a fraction comprising sulfur-containing compounds and a fraction comprising said aluminum halide.

Heretofore, various methods have been proposed for recovering aluminum halides from sludges of the above character, including such methods as the treatment of the sludge with an anhydrous hydrogen halide, with halogens, with carbon monoxide and with a variety of other reagents of more or less effective character. In many of these methods, however, the recovery is incomplete and various side reactions occur during the recovery operation which alters the composition of the final recovered aluminum halide or introduces impurities into the product making the latter undesirable for further use in the process or necessitating further purification of the product. I have found, according to the present invention, that the above mentioned sludges may be regenerated and the aluminum halide recovered therefrom in essentially one operation by heating the same with elemental sulfur in certain optimum proportions and under certain reaction conditions. The regeneration of aluminum halides from sludges containing them according to the process herein described is believed to depend upon the reaction of the sulfur with the carbon-to-hydrogen linkages of the organic compounds contained in the sludge. In thus cleaving the hydrocarbon linkages, the sulfur is released from the reaction as hydrogen sulfide while the aluminum halide is simultaneously liberated and may be recovered as the free compound.

According to the operation of the process of this invention, the sludge is admixed with from about one-fourth to about one weight proportion of elemental sulfur and the mixture is heated to effect reaction of the components. During the heating operation in which the ultimate temperature may increase to as high as 250–300° C., free organic compounds originally contained in the sludge, which in the case of a sludge recovered from a hydrocarbon conversion reaction may comprise light hydrocarbon gases, such as ethylene or propylene, are initially released from the reaction mixture. As the temperature is further increased, liquid organic compounds such as hydrocarbonaceous products, are released from the mixture which if desired, may be allowed to escape into a fractionating column and separated therein into suitable fractions. As the temperature is increased still further, to the vaporizing temperature of the aluminum halide, the latter also distills and/or sublimes from the reactor and may be recovered as a crystalline solid. It is to be understood however, that the aluminum halide residue remaining after removal of the hydrocarbonaceous volatile matter and hydrogen sulfide need not necessarily be volatilized to effect recovery of said aluminum halide but may be extracted therefrom with a suitable solvent for aluminum halide, such as a nitroparaffin (for example, nitroethane) or a nitroaromatic compound such as nitrobenzene. Generally however, a more highly purified product is obtained if the aluminum halide is volatilized from the residue and condensed.

In an alternative modification of the process the heated reaction mixture may be flashed into a fractionating device maintained at a lower pressure. In the latter method the products of reaction are separated as they are flashed and are separated as they enter a fractionator into liquid by-products and a solid aluminum halide condensate. In a preferred method of operation, the aluminum halide is re-distilled to separate a solid, more highly purified aluminum halide product. Other fractions of the distillate comprising hydrocarbons and various sulfur compounds may be separated and utilized as desired.

The invention is described in greater detail with reference to a specific embodiment of the present process shown in the accompanying diagram. It indicates however, but one method of operation and is chosen for illustrative purposes only with no intention of defining all aspects of the generally broad scope of this invention.

Referring to the drawing, a mixture of from about one-fourth to about one weight proportion of sulfur per unit weight of an aluminum halide sludge, obtained, for example, from an aluminum chloride or an aluminum bromide butane isomerization reaction, is introduced into primary reaction zone 1, the aluminum halide sludge being introduced through line 2 and solid sulfur through line 3. Primary reaction zone 1, wherein the principal reaction of this process occurs, is desirably provided with a stirring means, comprising, for example, revolving paddles to obtain intimate contact between the sludge and sulfur introduced into said zone. Zone 1 is also preferably a reactor capable of withstanding high pressure so that the ensuing reaction of the sulfur with the aluminum halide sludge may be conducted at high pressure when the temperature of the reactor contents is increased. After thorough mixing of the reactants, heat is applied until a reaction occurs which is evidenced by the liberation of hydrogen sulfide.

The temperature in primary reaction zone 1 is preferably allowed to increase up to about 200° to about 300° C. and the resultant liquid and gaseous products discharged from said zone through line 4 into primary separation zone 5. The latter zone may be a flashing tower in which the gaseous products are separated from the liquid and solid materials. The light liquid products consisting of low boiling, normally liquid hydrocarbons, such as the pentanes, pentenes, etc., and in some cases low molecular weight mercaptans and other organic sulfur-containing compounds which are separated in said zone 5 are withdrawn through line 6 and may be further separated into purified products by means not shown on the accompanying diagram such as a fractionator operated incidentally to the present process. The latter products after separation and purification may comprise valuable by-products of the principal process.

Still other by-products of the process, comprising normally gaseous compounds, are separated in zone 5 and removed through line 7. The latter effluent may consist of gaseous sulfur compounds, such as hydrogen sulfide, low boiling mercaptans and the normally gaseous hydrocarbons such as methane, ethylene, propylene, etc. If desired, the hydrogen sulfide may be separated from the above gaseous effluent and the sulfur recovered therefrom, as for example by introducing oxygen or air into the gas and reacting the resultant mixture to form a product containing sulfur and water. The reaction is accomplished in the presence of suitable catalytic agents such as alumina or aluminum silicate composites. Operations of this nature are familiar to those skilled in the art and are not directly related to the process of this invention; the description of them is therefore intentionally omitted for the sake of simplicity.

The residue remaining in zone 5 after removal of the light or low boiling products, consisting of a semi-solid material, is removed from said zone through line 8 and transferred into secondary separation zone 9 where the material is heated to a higher temperature for the distillation therefrom of higher boiling normally liquid products. The latter, which may comprise hydrocarbons and/or mercaptans, if present in the product, are vaporized and removed from zone 9 through line 10 and discharged from the process. If a highly purified aluminum halide product is ultimately desired, separation zone 9 may consist of a fractionating device wherein the normally liquid products are distilled from the residue and eventually the aluminum halide is sublimed and condensed. The solid aluminum halide product is removed from the process through line 11 which may connect directly with the conversion reaction in which the aluminum halide is employed as catalyst or it may be directed into a further purification means if a more highly purified product is desired.

The residue remaining in separation zone 9 after removal therefrom of substantially all volatile products is essentially a coke-like material which is discharged from zone 9 through line 12 and utilized as fuel or further purified for recovery of the coke. Thus in a single operation the aluminum halide sludge herein referred to and normally considered a worthless material difficult to dispose of is converted by the process of the present invention into a valuable aluminum halide reagent and by-products directly utilizable as recovered.

To demonstrate the efficiency of recovering and purifying aluminum halide by means of the present invention, an aluminum chloride catalyst was recovered from the sludge formed in an aluminum chloride-hydrogen chloride catalyzed isomerization process, the sludge appearing as the hydrocarbon insoluble lower layer in the reactor in which said isomerization reaction was conducted. The sludge was a semi-mobile liquid having a slightly brown color which fumed on contact with moist air. Four parts by weight of said sludge to three parts by weight of sulfur were charged into a distillation column and heated to a temperature of 260° C. As the reaction mixture heated to this temperature, hydrogen sulfide was evolved and an oily liquid product distilled over from the reactor, the final fractions of which solidified to a solid crystalline mass. The yield of redistilled solid, comprising essentially aluminum chloride, was approximately 40% by weight of the sludge charged.

I claim as my invention:

1. A process for recovering an aluminum halide of a middle halogen from an aluminum halide sludge which comprises reacting said sludge with elemental sulfur at an elevated temperature and thereafter separating aluminum halide from the resulting reaction products.

2. A process for recovering an aluminum halide of a middle halogen from a sludge containing the same which comprises reacting said sludge with elemental sulfur at an elevated temperature to form a normally gaseous phase containing hydrogen sulfide, a normally liquid phase containing carbonaceous material and a normally solid phase containing said aluminum halide and separating said phases.

3. A process for recovering an aluminum halide of a middle halogen from a sludge containing the same which comprises reacting said sludge with elemental sulfur at a temperature of from about 200° to about 300° C. to form a normally gaseous phase containing hydrogen sulfide, a normally liquid phase containing carbonaceous material and a normally solid phase containing said aluminum halide and separating said phases.

4. A process for recovering an aluminum halide of a middle halogen from a sludge containing the same which comprises reacting said sludge with elemental sulfur in a weight proportion of said sulfur to said sludge within the range of from about 1:4 to about 1:1 at an elevated temperature to form a normally gaseous phase containing hydrogen sulfide, a normally liquid phase containing carbonaceous material and a normally solid phase containing said aluminum halide and separating said phases.

5. The process set forth in claim 4 further characterized in that said sludge is reacted with said sulfur at a temperature within the range of from about 200° to about 300° C.

6. A process for recovering an aluminum halide of a middle halogen from a sludge containing the same which comprises reacting said sludge with elemental sulfur at a temperature within the range of from about 200° to about 300° C. and distilling from the product thereof a light gaseous fraction containing hydrogen sulfide, a heavier normally liquid product and a solid residue comprising said aluminum halide.

7. The process of claim 6 further characterized in that said aluminum halide is aluminum chloride.

MAURICE J. MURRAY.